United States Patent [19]

Pope

[11] Patent Number: 5,145,189
[45] Date of Patent: Sep. 8, 1992

[54] HYDRO-LIFT DYNAMIC CIRCUMFERENTIAL SEAL

[75] Inventor: Adam N. Pope, Cincinnati, Ohio

[73] Assignee: General Electric Company, Cincinnati, Ohio

[21] Appl. No.: 757,774

[22] Filed: Sep. 11, 1991

[51] Int. Cl.$^5$ .......................... F16J 15/30; F16J 15/34
[52] U.S. Cl. .......................... 277/3; 277/70; 277/75; 277/96.1; 277/157; 277/192; 277/215
[58] Field of Search .......................... 277/3, 27, 44–46, 277/70, 74, 75, 96.1, 142, 154, 157–163, 192, 201, 214, 215

[56] References Cited

U.S. PATENT DOCUMENTS

| | | | |
|---|---|---|---|
| 2,012,956 | 9/1935 | Chaffin | 277/154 |
| 2,449,297 | 3/1941 | Hoffer . | |
| 3,047,299 | 7/1962 | Karsten | 277/75 |
| 3,376,083 | 4/1968 | Muijderman . | |
| 3,575,424 | 4/1971 | Taschenberg | 277/154 X |
| 3,640,541 | 2/1972 | Taschenberg | 277/96.1 |
| 3,743,303 | 7/1973 | Pope | 277/75 X |
| 4,082,296 | 4/1978 | Stein | 277/96.1 X |
| 4,116,503 | 9/1978 | Licht . | |
| 4,383,771 | 5/1983 | Freytag et al. . | |
| 4,398,730 | 8/1983 | Rücker et al. | 277/96.1 |
| 4,743,162 | 5/1988 | Pope | 277/215 X |
| 4,916,892 | 4/1990 | Pope | 277/96.1 X |
| 4,943,069 | 7/1990 | Kinnouchi | 277/45 X |
| 5,058,904 | 10/1991 | Neuola | 277/44 |

FOREIGN PATENT DOCUMENTS 373406 7/1920 Fed. Rep. of Germany ...... 277/157
63057 5/1980 Japan ..................... 277/3

OTHER PUBLICATIONS

J. L. Cabe et al.; "Advancing the Mundane Seal"; *Leading Edge*; pp. 12–15.

*Primary Examiner*—William A. Cuchlinski, Jr.
*Assistant Examiner*—Scott W. Cummings
*Attorney, Agent, or Firm*—Jerome C. Squillaro; John R. Rafter

[57] ABSTRACT

A hydro-lift seal for the bore region of a seal segment having a shallow groove inlet on the high pressure side of the seal segment. The shallow groove inlet is aerodynamically connected to a shallow groove which extends in the direction of rotation of a seal race, the seal race being connected to a rotating shaft. The shallow groove is aerodynamically connected to a deep groove which has an interface region which is perpendicular to the shallow groove and a region which is parallel to the shallow groove. A vent groove located on the low pressure side of the seal segment is parallel to that region of the deep grove which is parallel to the shallow groove. A plurality of venting holes is located in the vent groove which connect the vent groove to the high pressure side of the seal segment.

9 Claims, 2 Drawing Sheets

HYDRO-LIFT DYNAMIC CIRCUMFERENTIAL SEAL

CROSS-REFERENCE

Reference is made to the related and co-pending application which is identified by Ser. No. 07/757,777 filed concurrently herewith and is hereby incorporated by reference.

BACKGROUND OF THE INVENTION

The present invention relates to seals for use in a gas turbine engine. More particularly, the present invention relates to a hydro-lift seal for a circumferential seal segment which effectively reduces the rubbing forces experience by the seal thereby extending seal longevity.

In the aircraft industry, a "circumferential seal" is a name which describes a generic type of sealing device which is used in military and commercial aircraft. A circumferential seal is generally comprised of several arcuate segments made of carbon or other suitable material which are arranged circumferentially to form a continuous sealing ring around the periphery of a rotating shaft. The segments are typically supported against a race which interfaces the seal to a rotating element. The segment ends may contain overlapping tongue and socket joints to restrict leakage at the end gaps. These seals are used to separate areas of high pressure fluid from areas of lower pressure fluid. In a typical application, circumferential seals prevent the leakage of oil from a lower pressure compartment and minimize the flow rate of hot air from a high pressure area to the lower pressure, oil wetted compartment.

To achieve the long wear life which is demanded in modern engine applications, it is necessary to reduce the contact forces (unit loads) which interact between the stationary carbon segments of the circumferential seal and an adjacent surface of a rotating shaft or race connected to the shaft. In practice, the pressure drop between the high and low pressure areas reacts across the stationary carbon segments and generates a rubbing force between the segments and the adjacent rotating surface which is nearly proportional to the magnitude of the pressure drop.

Presently, state of the art circumferential seals are limited to pressure drops on the order of 20 to 40 psi for purposes of satisfying wear life requirements. In efforts to increase the pressure range of these seals, much work has been expended in the application of hydrodynamic gas bearings to the rubbing face of the carbon segments, i.e., to the face or bearing surface adjacent the rotating shaft.

Hydrodynamic gas bearings are well known devices within which a pressure rise is generated by the shearing gradient between the rotating shaft and stationary carbon elements. This pressure rise, acting against the bearing area on the surface of the seal segment, generates a force which is opposite in direction to the rubbing force generated by the ambient pressure drop. This effectively reduces the rubbing loads and increases the pressure range capability of the seal.

However, the problem with state of the art hydrodynamic gas bearings is that they require a very shallow depth. As presently configured and when used with gases as the medium, bearing pocket depths on the order of 0.001 inches or less are required to generate sufficient lift force to extend the pressure range of the seal. This inherent shallowness does not allow sufficient latitude to prevent wearing away the gas bearing during periods when surface speed is too low to generate sufficient hydrodynamic forces, or when centrifugal inertia, pressure and thermal gradients distort the rubbing interfaces and result in loss of gas bearing capacity. Therefore, when 0.001 inches of wear occurs, the gas bearings are utterly destroyed thereby creating an unacceptable situation. Therefore, a need exists for an assembly or apparatus which would effectively extend the allowable wear of a gas bearing.

SUMMARY OF THE INVENTION

Accordingly, one object of the present invention is to provide a circumferential seal assembly which has an extended longevity even when exposed to high differential pressure levels. Another object of the present invention is to provide a circumferential seal assembly which can sustain large pressure drops across bearing compartment walls thereby eliminating the need for hardware which vents pressurized air to a lower pressure sink. Still another object of the present invention is to provide a circumferential seal assembly which improves engine cycle efficiency.

Yet another object of the present invention is to provide a circumferential seal assembly which decreases engine cost and weight.

These and other valuable objects and advantages of the present invention are provided by a seal segment which has a high pressure side and a low pressure side, the seal segment having a bore region. The bore region has a shallow groove inlet which is located on a high pressure edge of the bore region. A shallow groove is aerodynamically coupled to the shallow groove inlet, and a deep groove is aerodynamically coupled to the shallow groove. A vent groove which is parallel to the deep groove is aerodynamically coupled to the high pressure side by a plurality of vent holes.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

When referring to the drawings, it should be understood that like reference numerals designate identical or corresponding parts throughout the respective figures.

DETAILED DESCRIPTION OF THE INVENTION

Figure 1:
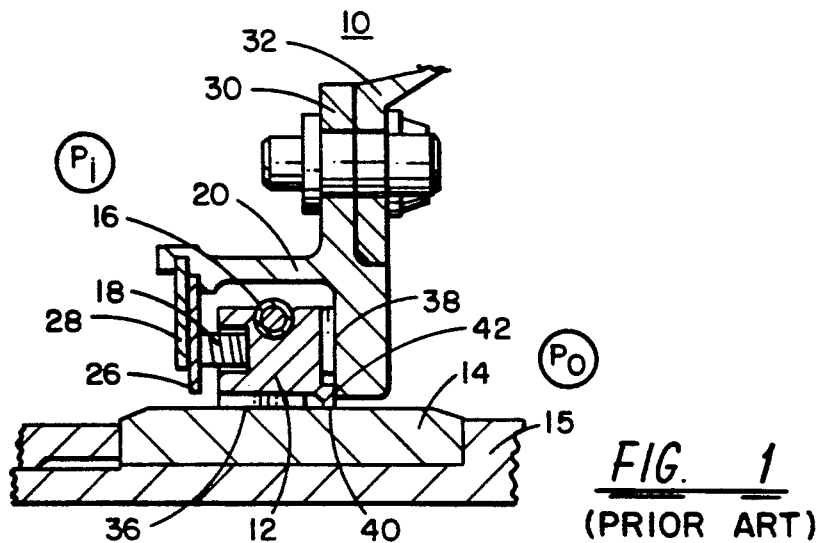
FIG. 1 is a cross-sectional, schematic illustration of a prior art circumferential seal installation.

In FIG. 1, a prior art circumferential seal installation 10 has a high pressure side Pi and a low pressure side Po. In a typical engine application, the low pressure side Po is oil wetted as would be required for a lubricated bearing compartment. Seal installation 10 is not equipped with hydrodynamic gas bearings.

The installation 10 has a plurality of carbon segments (e.g., carbon segment 12) which are arranged circumferentially to form a continuous sealing ring. Segment 12 and the segments to which it is attached are loaded radially against a seal race 14 by radial springs (e.g., spring 16). Seal race 14 is fixed to and rotates with shaft 15.

Figure 2:
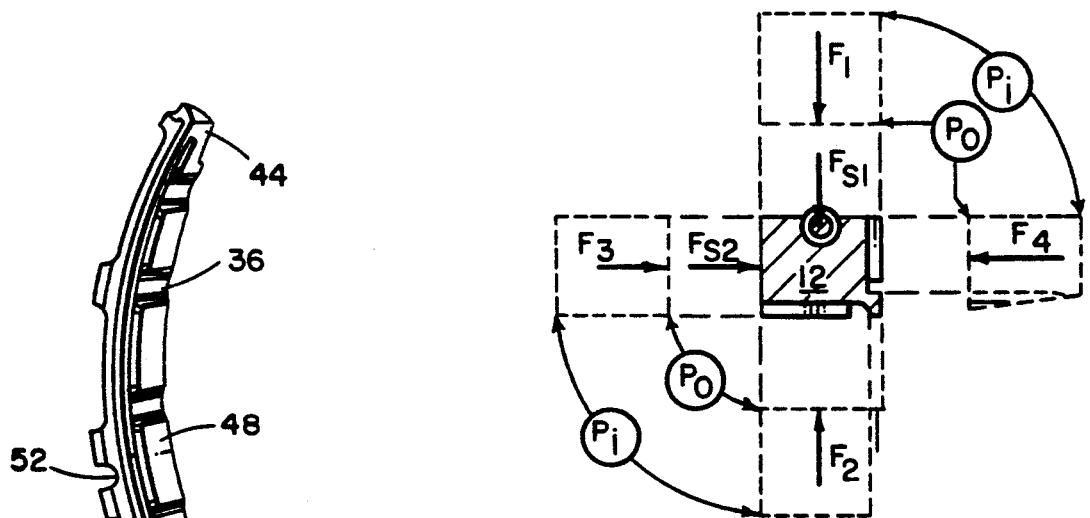
FIG. 2 is a force diagram for the seal installation of FIG. 1.

With reference to FIG. 1 and the force diagram of FIG. 2, spring 16 produces a force Fs1 and a net radial pressure force (F1-F2), where F1+Fs1>F2. Axial springs (e.g., axial spring 18) produce a force Fs2 which directs carbon segment 12 toward the face of seal housing 20. A net axial pressure force is indicated by (F3-F4), F3+Fs2>F4. Axial spring 18 is secured to back plate 26 which is interfaced with retainer ring 28. Back plate 26 and retainer ring 28 are both secured to seal housing 20. The seal housing 20 is integrally connected to a flange 30 which is bolted or attached to frame 32.

Bore vent 36 and face vent 38 bleed the high pressure gas to the upstream edges of the bore seal land 40 and face seal land 42, respectively, thereby providing a substantial reduction in net radial and axial pressure forces. As can be seen from FIG. 2, the forces are not completely balanced and increase as the pressure drop Pi-Po increases.

Figure 3:
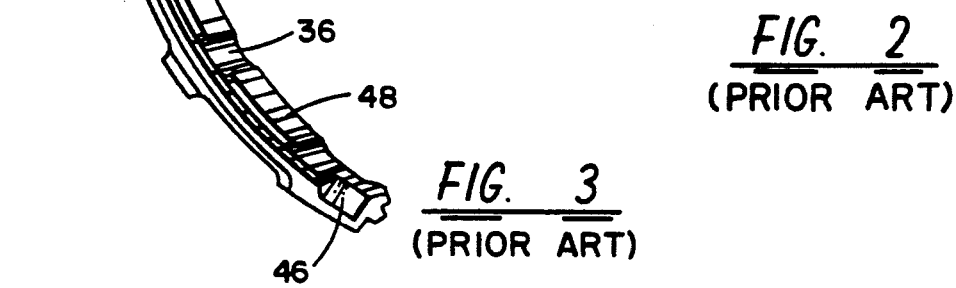
FIG. 3 is a plan view of a prior art seal segment.

FIG. 3 is a perspective view of a prior art carbon segment such as segment 12 of FIG. 1. The segment 12 is provided with a tongue region 44 and a socket region 46 located at opposite ends of the segment which are used to connect to socket and tongue regions of an adjoining segment, the tongue of one segment connecting to the socket of another segment. The segment is provided with bore wear pads 48 on its radially inner surface with the wear pads being circumferentially separated by bore relief areas or bore vents 36. The face seal land or dam 42 and bore seal land or dam 40 are shown along the radially inner edge of the segment. A lock pin slot 52 in each segment engages a rotation lock (not shown) in the seal housing 20 to evenly space the seal segments and to prevent their rotation from frictional engagement with seal face 14.

The wear rate of the carbon segments at their interface with the rotating race is a function of the above described axial and radial forces. In the prior art seal installation 10 of FIG. 1, the wear life of the segments decreases as the differential pressure increases. Demands for long life in modern engines have limited the allowable pressure drop for the installation of FIG. 1 to approximately 20 to 40 psig. In attempts to extend the life and/or pressure range of this type seal, much experimentation has been undertaken with the addition of hydrodynamic gas bearings to the bore wear pads 48.

Figure 4A:
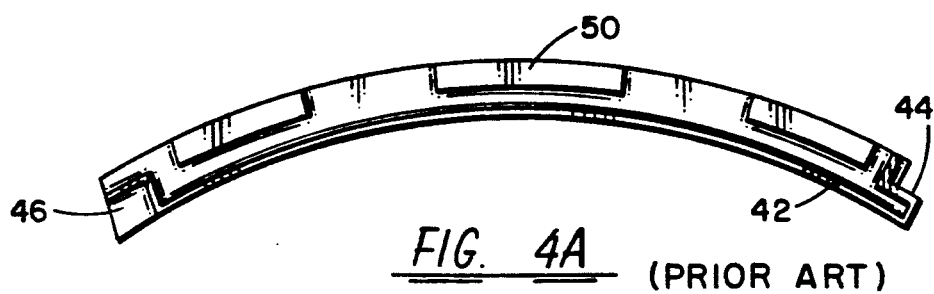
FIG. 4A is a face view of a prior art seal segment.

FIG. 4A is a plan view taken normal to the face side of a prior art seal segment 12 illustrating the face wear pads 48 which contact the face of the seal housing 20. Face seal land 42 can be seen located at the radially inner edge of segment 20 for contacting the radially inner edge of the face of the seal housing 20.

Figure 4B:
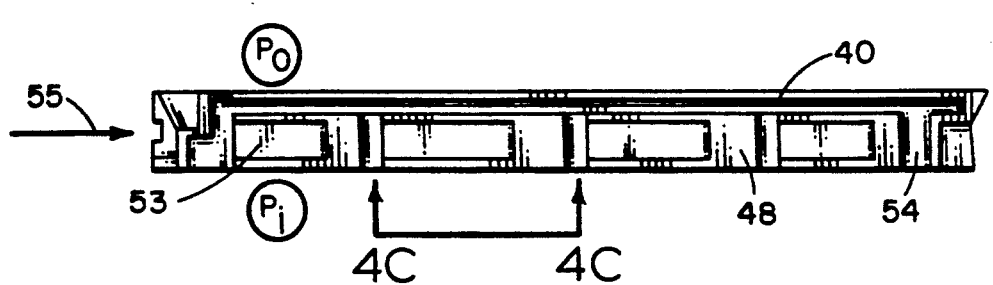
FIG. 4B is a bore view of the prior art seal segment of FIG. 4A.

FIG. 4B is a plan view taken normal to the radially inner bore face of the segment of FIG. 4A and illustrates bore sealing land 40 along an edge of segment 20 adjacent the low pressure side Po. The bore sealing land 40 frictionally engages a seal race such as seal race 14. The bore wear pads 48 differ from the face wear pads 50 in that each pad 48 includes a very shallow hydrodynamic bearing pocket 53. Venting grooves 54, similar to the bore vents 36 of FIG. 3, are provided between each adjacent ones of the bore wear pads 48. Arrow 55 indicates the direction of rotation of a surface engaging or adjacent pads 48.

Figure 4C:
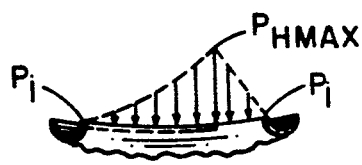
FIG. 4C is a graphic diagram of hydrodynamic pressure along line A—A of FIG. 4B.

FIG. 4C demonstrates the hydrodynamic pressure (Ph) rise which occurs in the bearing pockets 53. In particular, FIG. 4C demonstrates the hydrodynamic rise which occurs along line A—A of FIG. 4B. This rise is produced by the shearing gradient at the interface of the very shallow hydrodynamic bearing pockets 53 and the adjacent surface of the rotating race. Gas bearings pockets 53 (four are shown), separated in the circumferential direction by very deep venting grooves 54, are machined on the bore face on each pad 48 of each segment.

Since the hydrodynamic pressure (Ph) rise increases as a function of length of the bearing pocket in the direction of race rotation, and inversely with a function of bearing pocket depth, the shortness of the bearings must be combined with very shallow pocket depths to produce a pressure rise adequate to improve the capability of the seal to operate at higher levels of pressure differential.

The shallowness of these bearing pockets, which is usually in the order of 0.001 inch or less, combined with the loss of wearing surface area caused by introduction of the pockets, has, however, limited the acceptance of the configuration of FIG. 4B as a viable candidate for long life high pressure applications.

Figure 5:
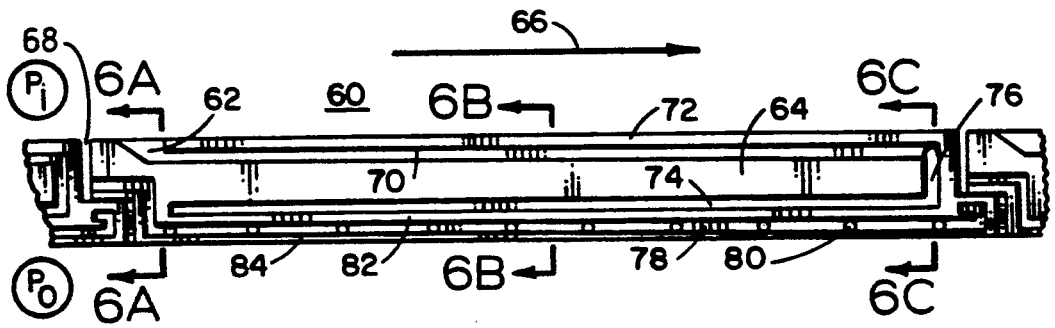
FIG. 5 is a schematic diagram of the hydro-lift seal according to the present invention and includes graphical and cross-sectional illustrations.

With reference to FIG. 5, there is shown a bearing segment 60 according to the present invention which incorporates a shallow grove inlet 62 located on the high pressure (Pi) edge of the bore 64 of seal segment 60 immediately downstream (in the direction of shaft rotation indicated by arrow 66) to the segment end gap 68. The inlet 62 is shaped to allow entrance of high pressure (Pi) gas to a shallow groove 70 with a minimum of restriction to inflow. The shallow groove 70 runs parallel and in close proximity to the high pressure (Pi) face of the segment defining a land along the segment edge. The length of shallow groove 70 is only slightly less than the length of segment 60.

The shallow groove 70 exhausts into a deep groove through an interface slot 76 which is generally perpendicular to the grooves 70 and 74. Groove 74 is of equal depth to slot 76 and is generally parallel to the shallow groove 70. A vent groove 78 is located in close proximity to and generally parallel to groove 66. Vent groove 78 is vented to the high pressure gas region (Pi) through venting holes 80. With this configuration, the ambient pressure distribution of Pi and Po is substantially the same as that of FIG. 2. A land 82 is defined by and between grooves 74 and 78. Another land 84 is defined along the edge of segment 60 by groove 78. Note that area 64 is essentially a wear pad.

With further reference to FIG. 5, air dragged into the shallow groove 70 by the shearing gradient at the surface of the race (not shown) generates a hydrodynamic pressure (Ph) rise which increases in the circumferential direction and is at a maximum at the point where the shallow groove 70 exits into the relatively deep slot 76. As long as the segment is in contact with the surface of the race, there is no leakage of air across the sealing lands 72, 64, 82, and 84 surrounding the grooves 70 and 74 and slot 76. Therefore, the pressure in the deep groove 74 is equal to the pressure at the exhaust end of the shallow groove 70 at the trailing end of the segment 60 (in the direction of race rotation indicated by arrow 66) and equal to the shallow groove exit pressure minus the shearing pressure losses at the leading edge.

Figure 6A:
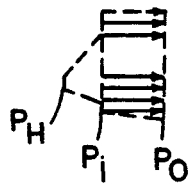
FIGS. 6A, 6B, and 6C are radial pressure profiles taken at locations indicated by lines B—B, C—C, and D—D, respectively, in FIG. 5.
Figure 6B:
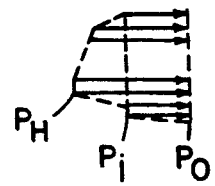
Figure 6C:
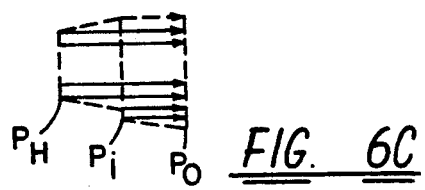
Figure 7:
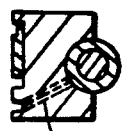
FIG. 7 is a cross-sectional view taken at line D—D of FIG. 5.

Since the depth of the deep groove 74 is much greater than the shallow groove 70 and the shearing gradient diminishes as the depth increases, the shearing pressure loss in the deep groove is negligible. FIGS. 6A, 6B, and 6C illustrate the radial pressure profiles acting on segment 59 at three circumferential locations indicated by lines B—B, C—C, and D—D, respectively. FIG. 7 is a cross-sectional view of the seal segment 60 taken at D—D.

Because the shallow groove 70 of the present invention is several times longer than the hydrodynamic bearing pockets 53 of the prior art shown in FIG. 4B, groove 70 can be several times deeper to generate the same pressure rise. Also, with the deep groove 74 distributing the maximum hydrodynamic pressure through the circumferential length of the segment, the average pressure on the bore of the segment is increased greatly, as can be seen by inspection of the pressure profiles as shown in FIGS. 6A, 6B, and 6C. It is obvious also that a higher percentage of bore surface area is available to share the rubbing forces with this configuration because the total area of pockets and vents is a smaller percentage of the surface of the segment. This effectively reduces the specific rubbing loads which decrease wear rate of the carbon segments thereby extending seal life. It should be noted that while the segments 60 are preferably formed of carbon, other materials may be used for the segments.

A seal of approximately nine inches diameter with six segments can be made to operate with a net rubbing force equal to zero while operating at 125 pounds per square inch differential pressure and 400 feet per second rubbing velocity with a shallow groove 70 having a depth equal to 0.023 inches and a deep groove 74 having a depth of 0.046 inches. It is expected that the seal would be manufactured with slightly greater groove depths and be allowed to wear until radial forces are equalized, after which the wear rate at this operating condition theoretically would approach zero. For this example, a seal segment 60 is about 0.50 inches wide, grooves 70, 74 and 78 are each 0.050 inches wide, lands 72 and 82 are each 0.050 inches wide and land 84 is 0.023 inches wide. The present invention is designed for very high differential pressure levels and extended life and serves to diminish heat generation rates. Since the present invention has a greater bore area than prior art gas bearings, lower specific rubbing loads are experienced for a given amount of radial force. In addition, the present invention can accommodate increased bore sealing dam width for better structural stability which serves to prevent damage during handling and assembly.

Although face seals can also be designed for very high differential pressure levels, face seals are more expensive to manufacture and, because face seals are limited in axial travel, the method of engine assembly and disassembly is complicated by their use. In addition to being lower in cost, the circumferential seal has unlimited axial travel and does not affect the method of engine assembly or disassembly. However, the principle described above which is applicable to the shallow/deep groove hydrodynamic gas bearings for a circumferential seal can also be applied to a face seal. In the present state of the art, face seals require very shallow depths to produce adequate hydrodynamic forces to generate long seal life. Previous attempts to circumvent this problem in face seals has been to transfer the hydrodynamic geometry into a hard coating on the face of the mating ring instead of in the carbon seal face in anticipation that the hard coating will wear at a slower rate than the carbon material. This, however, is a very expensive process. Therefore, the teachings of the present invention can be applied to face seals.

The foregoing detailed description is intended to be illustrative and non-limiting. Many changes and modifications are possible in light of the above teachings. Thus, it is understood that the invention may be practiced otherwise than as specifically described herein and still be within the scope of the appended claims.

What is claimed is:

1. A seal segment for a circumferential seal having a high pressure side and a low pressure side, said seal segment having a bore region extending circumferentially from a leading end to a trailing end of the segment, said bore region comprising:
   a relatively shallow groove inlet located on a high pressure edge of the bore region and opening onto the high pressure side of the seal segment;
   a relatively shallow groove aerodynamically coupled to said shallow groove inlet and extending generally parallel to and spaced generally adjacent the high pressure edge of the bore region; and
   a relatively deep groove aerodynamically coupled to said shallow groove at a location adjacent the trailing end of
   the seal segment, said deep groove extending generally parallel to said shallow groove and adjacent the low pressure side of the seal segment, said shallow groove and said deep groove establishing a land therebetween extending substantially from the leading end to the trailing end of the seal segment.

2. A seal segment according to claim 1 and including:
   a vent groove extending generally parallel to said deep grove between said deep grove and the lower pressure side of the seal segment; and
   at least one vent hole for aerodynamically coupling said vent groove with the high pressure side of the seal segment, for establishing a pressure along the bore region adjacent the low pressure side of the segment substantially equal to pressure at the high pressure side.

3. A seal segment according to claim 2 wherein said shallow groove exhausts into a relatively deep slot adjacent the trailing end of the seal segment, said slot being generally perpendicular to said shallow groove and connected to an end of said deep groove for establishing a gas pressure in said deep groove corresponding to the gas pressure in said shallow groove at the trailing end of the segment.

4. A seal segment according to claim 3 wherein said shallow groove and said deep groove extend substantially the length of the seal segment.

5. A seal segment according to claim 1 wherein said deep groove has an initial depth of about 0.046 inches.

6. A seal segment according to claim 1 wherein said circumferential seal segment is made of carbon.

7. A seal segment according to claim 1 wherein said seal segment is located radially outward from and hydrodynamically supported on a race coupled to a rotating shaft.

8. A seal segment according to claim 5 wherein said shallow groove is initially formed with a depth approximately one-half the depth of said deep groove.

9. A seal segment according to claim 3 wherein the gas pressure in said deep groove is equal to the gas pressure at the exhaust end of said shallow groove and equal to the shallow groove exhaust pressure minus shearing pressure losses at the leading edge of the shallow groove.

* * * * *